United States Patent [19]
Domyan

[11] 3,880,054
[45] Apr. 29, 1975

[54] VALVE ACTUATOR
[75] Inventor: Frank F. Domyan, Canoga Park, Calif.
[73] Assignee: International Telephone and Telegraph Corporation, New York, N.Y.
[22] Filed: June 27, 1973
[21] Appl. No.: 374,033

[52] U.S. Cl. .................................. 92/129; 92/130
[51] Int. Cl. .......................... F16j 1/10; F01b 31/00
[58] Field of Search ............ 92/129, 138, 101, 130; 251/63.4; 403/121

[56] References Cited
UNITED STATES PATENTS

| | | | |
|---|---|---|---|
| 2,277,124 | 3/1942 | Maliphant et al. | 92/129 |
| 2,616,991 | 11/1952 | Slomer | 92/129 |
| 3,070,022 | 12/1962 | McCormack | 92/129 |
| 3,444,784 | 5/1969 | Wengerd | 92/129 |
| 3,614,913 | 10/1971 | Clark | 92/138 |

FOREIGN PATENTS OR APPLICATIONS

| | | | |
|---|---|---|---|
| 636,247 | 4/1950 | United Kingdom | 92/129 |

*Primary Examiner*—Paul E. Maslousky
*Attorney, Agent, or Firm*—A. Donald Stolzy

[57] ABSTRACT

A valve actuator which employs a hydraulic cylinder for moving the valve element of a valve assembly. The piston and piston rod in the hydraulic cylinder are in abutting relationship. A convexly curved projection coaxial with the cylinder is formed on the piston for engaging a flat end surface on the piston rod. This arrangement minimizes the wear on the piston and, thus, increases the life of the hydraulic cylinder.

2 Claims, 9 Drawing Figures

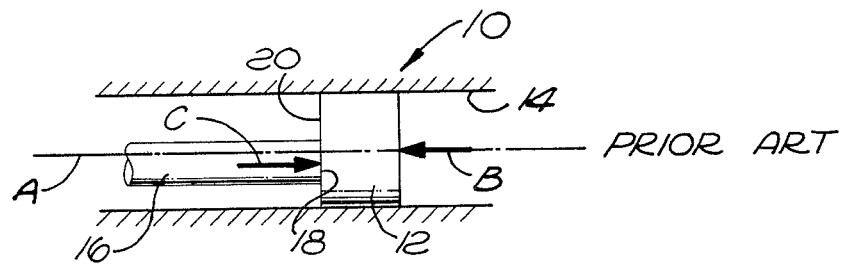
FIG.1. — PRIOR ART
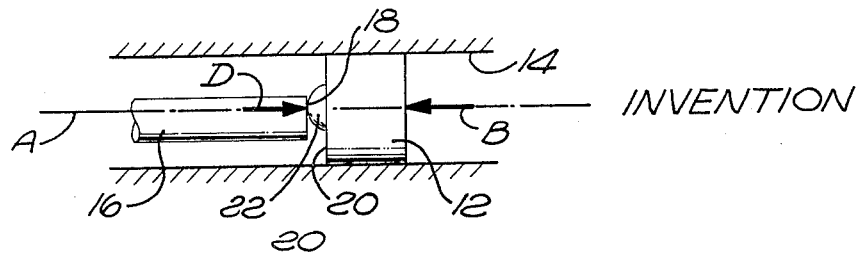
FIG.2. — INVENTION
FIG.3.
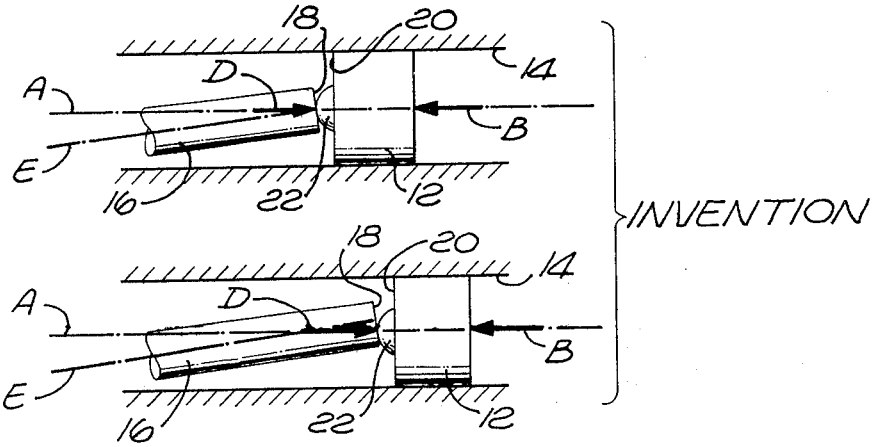
FIG.4.
FIG.5.
} INVENTION
FIG.6.
FIG.7.

VALVE ACTUATOR

BACKGROUND OF THE INVENTION

This invention relates generally to a valve actuator and, more particularly, to an improved hydraulic cylinder for use with a valve actuator.

It is old in the art to use hydraulic cylinders in valve actuators for providing a driving force to shift the movable valve element of a valve assembly. Typically, the piston rod in the hydraulic cylinder is mechanically coupled to the piston in the cylinder. However, not only does the mechanical coupling between the piston rod and piston add to manufacturing costs, but also the coupling is subjected to wear after substantial use which, in turn, may result in misalignment of the piston in the cylinder. Such misalignment of the piston produces wear of the surface thereof, thereby shortening the life of the actuator. Thus, it has sometimes been the practice to eliminate the mechanical coupling between the piston rod and piston and instead provide an abutting contact therebetween, with the piston rod being urged into contact with the piston by means of a spring. It is also desirable, in order to reduce manufacturing costs, to loosen manufacturing tolerances on the valve actuator. This sometimes results in misalignment of the piston rod in the cylinder of the hydraulic cylinder. Such misalignment may also result in wear of the piston thus shortening the life of the actuator. It is, therefore, the purpose of the present invention to provide a hydraulic cylinder for a valve actuator which may be manufactured with relatively loose tolerances and, therefore, at a relatively low cost yet compensates for any misalignment of the piston rod in the cylinder. As a consequence, wear of the piston is minimized and the life of the valve actuator is increased substantially.

SUMMARY OF THE INVENTION

According to the principal aspect of the present invention, there is provided a valve actuator having a hydraulic cylinder in which a piston rod is biased into abutting engagement with a slidable piston in the cylinder. The end of the rod facing the piston is formed with a flat surface. A convexly curved projection is formed on the piston coaxial with the axis of the cylinder thereby providing a curved bearing surface which engages the flat surface on the end of the piston. This arrangement has been found to be essentially insensitive to misalignment of the piston rod in the cylinder, thus minimizing friction between the piston and the cylinder and, therefore, increasing the life of the valve actuator.

BRIEF DESCRIPTION OF THE DRAWINGS

FIG. 1 is a schematic illustration of a conventional hydraulic cylinder of the type utilized in prior art valve actuators, with the piston rod shown offset from the longitudinal axis of the cylinder;

FIG. 2 is a schematic illustration of the hydraulic cylinder utilized in the valve actuator of the present invention wherein a curved projection is formed on the piston in the cylinder, with the piston rod shown offset from the axis of the cylinder;

FIG. 3 is a schematic illustration of a hydraulic cylinder in which the curved projection is formed on the piston rod rather than on the piston, and with the rod shown offset from the axis of the cylinder;

FIGS. 4 and 5 are schematic illustrations of the hydraulic cylinder of the present invention in which the piston rod is disposed at an angle to the longitudinal axis of the cylinder, with the rod and piston being shown in two different axial positions in the figures, respectively;

FIGS. 6 and 7 are schematic illustrations of a hydraulic cylinder in which the curved projection is formed on the piston rod, and the rod is disposed at an angle with respect to the axis of the piston, with the rod and piston being shown in two different axial positions in the respective figures;

DESCRIPTION OF THE PREFERRED EMBODIMENT

Figure 8:
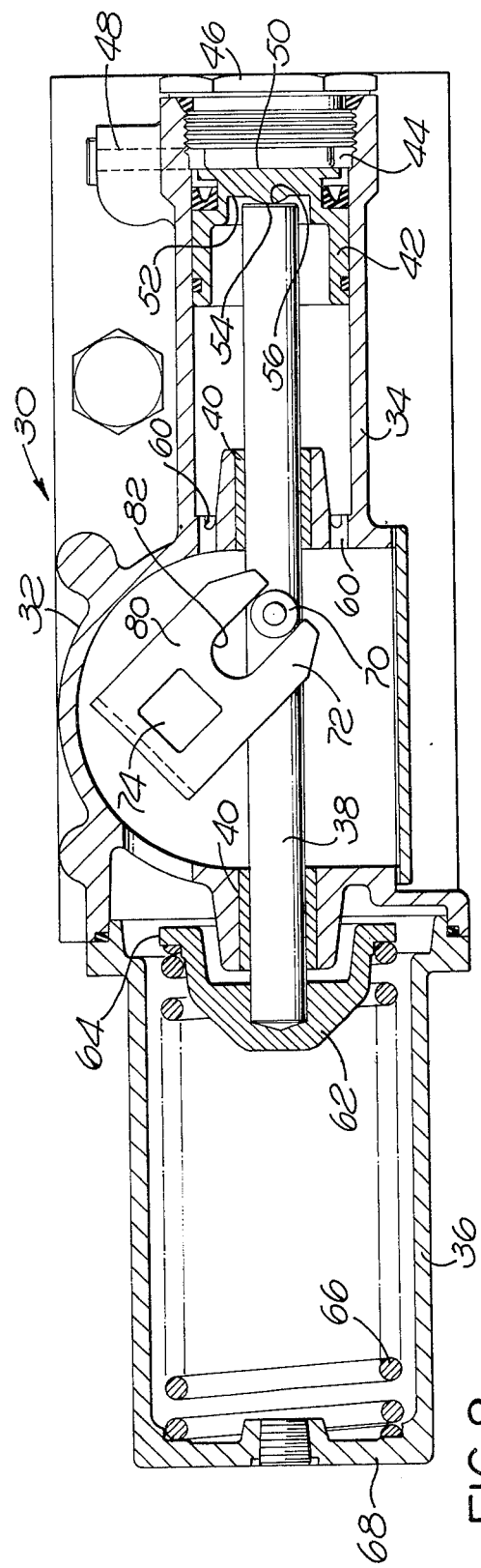
FIG. 8 is a partial longitudinal sectional view of the valve actuator of the present invention employing the hydraulic cylinder shown in FIG. 2.

Referring now to the drawings in detail wherein like reference characters designate like or corresponding parts throughout FIGS. 1–7, there is illustrated in FIG. 1 a conventional hydraulic cylinder, generally designated 10. The hydraulic cylinder includes a piston 12 which is slidably mounted in a cylinder 14. A piston rod 16 has a flat end surface 18 which is urged into abutting engagement with the face 20 of the piston 12 by a spring, not shown. As illustrated in FIG. 1, the axis of the rod 16 is offset from the longitudinal axis A of the cylinder 14, which may occur as the result of loose manufacturing tolerances. The offset is greatly exaggerated for purposes of illustration. Arrow B in FIG. 1 illustrates the center of hydraulic force which is applied against the piston 12. Arrow C, which is at the center of the piston rod 16, indicates the point of reaction force. As seen, the points of force acting upon the piston 12 are offset, thus producing a force couple which tends to tilt the piston in the cylinder 14. This may result in substantial wear of the piston, thus reducing the life of the hydraulic cylinder. It will be appreciated that such a force couple will be produced on the piston 12 whenever the rod 16 is offset from the axis of the cylinder 14.

FIG. 2 schematically illustrates the hydraulic cylinder of the present invention wherein a projection 22 is formed on the face 20 of piston 12 coaxial with the axis A of the cylinder 14. This projection extends toward the flat surface 18 on the end of the piston rod 16. The projection is convexly curved in longitudinal section thereby defining a curved bearing surface which abuts the flat surface 18 on the piston rod. In FIG. 2, as in FIG. 1, the axis of the piston rod 16 is shown offset from the axis A. However, unlike the hydraulic cylinder illustrated in FIG. 1, a point contact is provided between the curved projection 22 and the piston rod 16. This point of contact is indicated by arrow D which is coaxial with the center of hydraulic force indicated by arrow B. Thus, the point of reactive force D is opposite to the center of hydraulic force so that no force couple is produced on the piston 12. This is true regardless of the extent of offset of the piston rod 16 from the axis A of the cylinder 14. Since there is no force couple applied to the piston 12, wear of the piston is minimized and the life of the hydraulic cylinder is maximized.

Reference is now made to FIG. 3 of the drawing which illustrates a hydraulic cylinder similar to that shown in FIG. 2 except that the projection 22 is formed on the rod 16 rather than on the piston 12. The rod 16 is shown offset from the axis A of the cylinder in the same manner as in FIG. 2. It is noted that the point of contact between the projection 22 and the piston 12, and hence the point of reactive force indicated by arrow D, is offset from the center of hydraulic force indicated by arrow B. Thus, when the projection 22 is provided on the piston rod 16, a force couple will still be applied to the piston 12 when the rod 16 is offset from the axis A. Hence, it is seen that the advantage of the present invention is achieved only when the curved projection is formed on the piston 12.

FIGS. 4 and 5 illustrate the hydraulic cylinder of the present invention wherein the axis E of the piston rod 16 is disposed at an angle with respect to the axis A of the cylinder 14. The misalignment of the rod 16 is greatly exaggerated for purposes of illustration. It is noted that the point of reactive force D is almost opposite to the center of hydraulic force B, thus resulting in a small or no force couple on the piston 12. As seen in FIG. 5, when the rod 16 and piston 12 are shifted in the rightward direction in cylinder 14, the point of contact of the projection 22 with end surface 18 on the rod will be below that illustrated in FIG. 4. However, the end surface 18 will engage the projection 22 at the same point so that the reactive force D will be at at the same location as in FIG. 4. Thus, even if a slight force couple occurs as the result of the axis E of the piston rod 16 being disposed at an angle with respect to the axis A of the cylinder 14, the couple will be constant so that wear of the piston is minimized.

Referring now to FIGS. 6 and 7, there is illustrated a hydraulic cylinder similar to that illustrated in FIGS. 4 and 5 except that the projection 22 is shown as being mounted on the end surface 18 of the rod 16 rather than on the piston 12. As seen in FIG. 6, the point of reaction force D is essentially opposite to the center of hydraulic force B as shown in the hydraulic cylinder in FIG. 4. However, when the piston rod and piston 12 are shifted axially in the cylinder 14 to the position shown in FIG. 7, the projection 22 will engage the face 20 of the piston somewhat above the point of contact between these parts illustrated in FIG. 6, thus producing a force couple which tends to tilt the piston 12 in the cylinder 14. Thus, when the projection 22 is formed on the piston rod 16, and the rod axis is disposed at an angle with respect to the axis A of the cylinder 14, if a force couple is produced, such couple will change during axial translation of the piston and rod in the cylinder. Such changing force couple will produce considerable wear on the piston 12. From the foregoing, it is seen that wear of the piston 12 is minimized and the life of the hydraulic cylinder is maximized by forming a curved projection on the piston which abuts a flat surface on the end of the piston rod in the cylinder.

Figure 9:
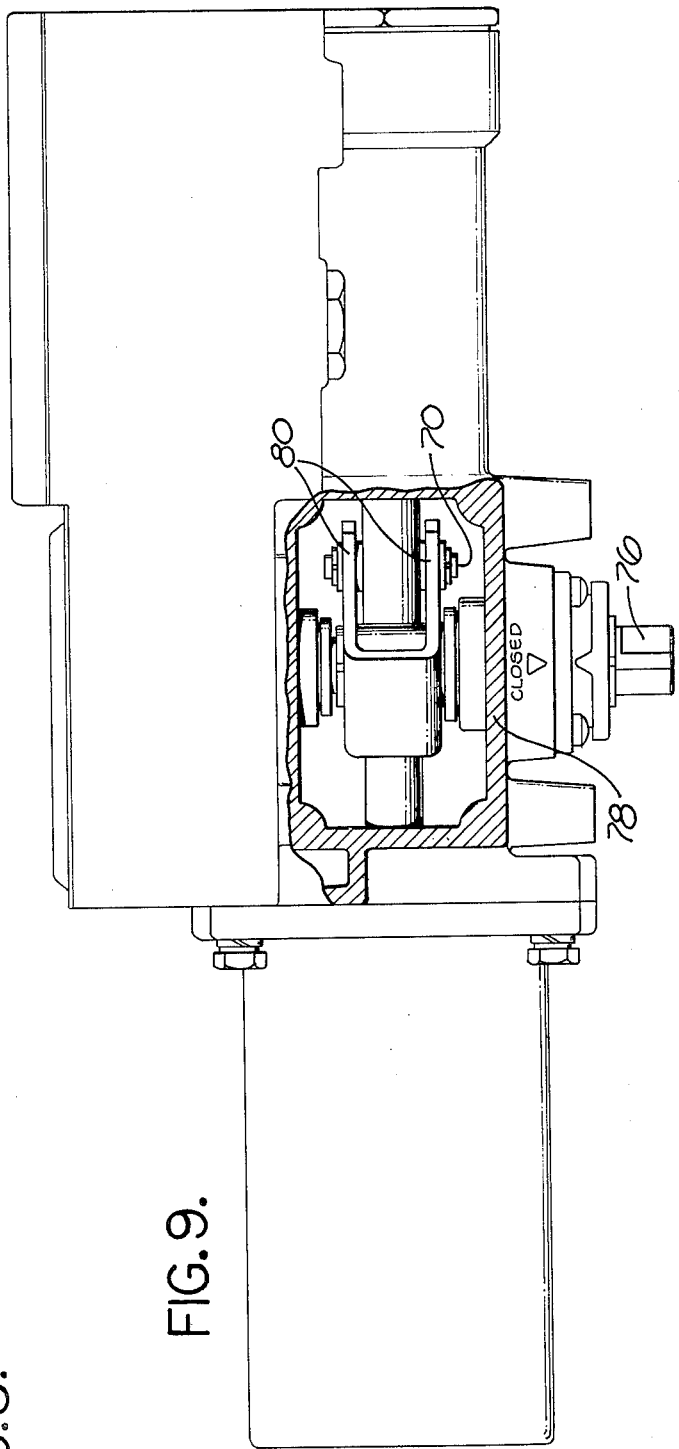
FIG. 9 is a side elevational view, partially in section, of the valve actuator rotated 90 degrees from the position illustrated in FIG. 8.

Reference is now made to FIGS. 8 and 9 which illustrate the preferred form of a valve actuator, generally designated 30, constructed in accordance with the present invention. The actuator comprises a housing 32 having a pair of coaxial cylinders 34 and 36 mounted on opposite sides of the housing. A piston rod 38 is slidably mounted in sleeves 40 in opposite walls of the housing coaxial with the axis of the cylinders 34 and 36. A piston 42 is mounted in the cylinder 34. A plurality of radially inwardly extending ribs 44 limit travel of the piston 42 in the rightward direction in the cylinder. The right end of the cylinder is closed by a cap 46. A fluid inlet port 48 extends into the cylinder between the face 50 of the piston and the cap 46. The opposite face 52 of the piston is formed with the curved projection 54 as described previously herein. Such projection abuts the flat end surface 56 on the rod 38. Such surface extends in a plane perpendicular to the axis of the cylinder 34. The curved projection is symmetrical about the axis of the piston. Bleed ports 60 are provided in the wall of the housing 32 between the interior of the cylinder 34 and the interior of the housing.

The opposite end of the rod 38 from the end surface 56 thereof extends into the cylinder 36. A cap 62 is frictionally mounted over this end of the rod. The cap is formed with a radially outwardly extending annular flange 64. A helical coil spring 66 is mounted between an end wall 68 of cylinder 36 and the flange 64. The spring biases the rod 38 in the rightward direction, thus holding the end surface 56 of the rod in abutting engagement with the curved projection 54 on the piston 42.

A pin 70 extends through the rod 38 in the housing 32 perpendicular to the axis of the rod. A yoke 72 is fixedly mounted to a rotatable shaft 74 which extends parallel to the pin 70. The end 76 of the shaft 74 extends through the wall 78 of the housing for coupling to the movable element of a valve assembly, not shown. The yoke includes a pair of laterally extending arms 80 which extend to opposite sides of the rod 38. These arms are formed with elongated slots 82 which slidably receive the exposed ends of the pin 70.

It will be appreciated that when fluid pressure is introduced through the port 48 into the cylinder 34, the piston 42 and, hence, the rod 38 will be shifted in the leftward direction in opposition to the force of the spring 66, thereby rotating the yoke 80 and, hence, the shaft 74, thereby actuating the valve assembly which is controlled by the actuator 30.

What is claimed is:

1. An actuator comprising: first means defining a cylinder and having a piston coaxially mounted in said cylinder for longitudinal slidable movement; a piston rod at least approximately coaxial with said cylinder and having one end slidable in said cylinder in spaced relationship thereto, said one end defining an essentially flat end surface facing said piston, said first means including a bearing fixed relative to said cylinder and having a bore in which said piston rod is slidable, the other end of said rod being an actuating member; said piston having a convex projection fixed relative thereto coaxial with said cylinder and extending toward said flat end surface on said rod; and second means causing said piston rod flat end surface and said piston projection to be biased into engagement with each other, said projection being out of contact with all structures except said piston and said piston rod flat end surface.

2. An actuator as set forth in claim 1, wherein said projection is hemispherical in shape.

* * * * *